Figure 1:
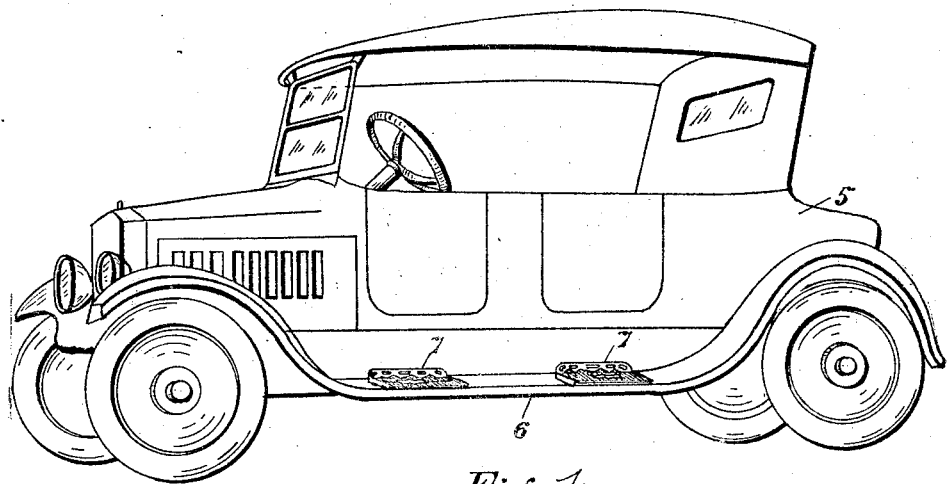

March 24, 1925. 1,530,743
W. WEST
LUGGAGE CARRIER FOR AUTOMOBILES
Filed Nov. 24, 1923  2 Sheets-Sheet 1

INVENTOR.
W. West
BY
ATTORNEY.

March 24, 1925.  1,530,743
W. WEST
LUGGAGE CARRIER FOR AUTOMOBILES
Filed Nov. 24, 1923   2 Sheets-Sheet 2
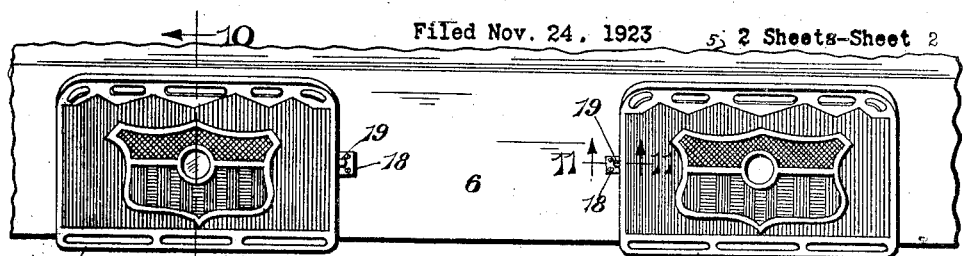
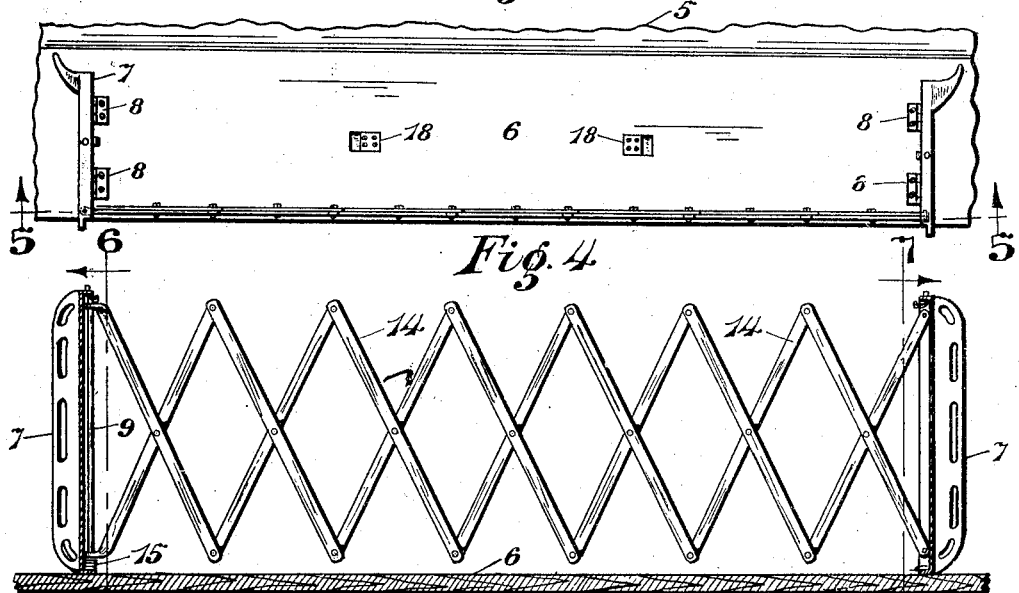
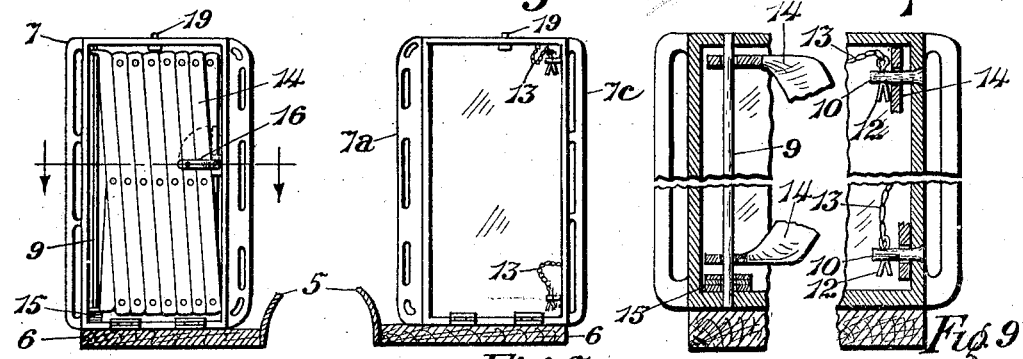
INVENTOR.
W. West
ATTORNEY.

Patented Mar. 24, 1925.

1,530,743

UNITED STATES PATENT OFFICE.

WILLIAM WEST, OF DENVER, COLORADO.

LUGGAGE CARRIER FOR AUTOMOBILES.

Application filed November 24, 1923. Serial No. 676,824.

*To all whom it may concern:*

Be it known that I, WILLIAM WEST, a citizen of the United States, residing at Denver, in the county of Denver and State of Colorado, have invented certain new and useful Improvements in Luggage Carriers for Automobiles, of which the following is a specification.

My invention relates to luggage carriers for automobiles and more particularly to carriers of the type including a folding rack which in its operative position extends along the edge of a running board of a motor vehicle to provide a walled receptacle for the safe conveyance of parcels, suitcases and other luggage.

It is an object of the invention to provide a collapsible or folding luggage-retaining member which when not in use is concealed beneath one of two step plates of the kind frequently used on automobiles to provide a combined foothold and scraper for passengers entering or leaving the same, and which in its operative position, co-operates with the step plates to form a rigid luggage carrier of the above described character.

Other objects of the invention principally residing in details of construction, will fully appear in the course of the following description of the preferred embodiment of the invention shown in the accompanying drawings.

In the drawings in the several views of which like parts are similarly designated—

Figure 2:
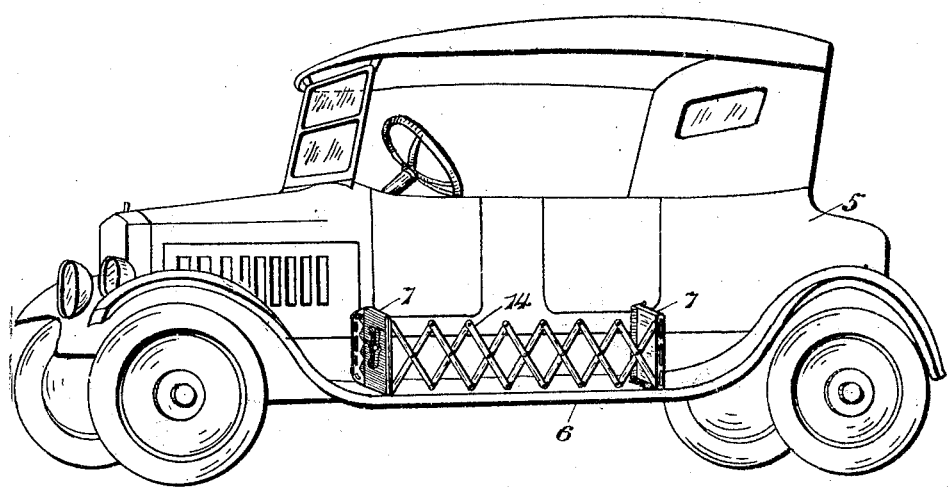

Figure 1 represents a perspective view of an automobile, showing the appearance of the step plates which form part of the invention, when the luggage carrier is not in use;

Figure 2, a similar view showing the luggage carrier in its operative position;

Figure 3, an enlarged fragmentary plan view of the running board to which the invention is applied, with the step plates in the position they occupy when the carrier is not in use;

Figure 4, a similar view of the running board with the carrier in its operative position;

Figure 5, a sectional elevation along the line 5—5, Figure 4;

Figure 6, a transverse section taken on the line 6—6, Figure 5, showing the folding wall-member of the carrier in its folded condition in one of the step-plates;

Figure 7, a section along the line 7—7 Figure 4;

Figure 8, an enlarged fragmentary sectional elevation of the step plate illustrated in Figure 4;

Figure 9, a similar elevation of the other step plate shown in its entirety in Figure 7;

Figure 10, a section along the line 10—10, Figure 3; and

Figure 11, an enlarged section taken on the line 11—11, Figure 3.

Referring more specifically to the drawings, the reference character 5 designates an automobile provided as usual with running boards 6 extending lengthwise along its sides.

The luggage-carrier mounted upon one of the running boards, comprises two step plates 7 of the usual superficial size and exterior form, which are fastened upon the running board preferably beneath the doors of the body of the vehicle.

Each step plate consists of corrugated or otherwise roughened metal plate provided along one of its side edges with an upwardly turned "kick" member 7ª and along its opposite side edge with a scraper member 7ᶜ. The plate has along its edges downwardly projecting flanges which when the step plate lies flat upon the running board form an enclosed space in which the other parts of the carrier-structure are normally concealed.

The step plates are hinged to the running board at their outer ends as shown at 8 in the drawings and the hinges are arranged inside the plates so that they do not show when the plates lie flat upon the running board in the normal position illustrated in Figures 1 and 3.

One of the step plates is provided with a rod 9 which extends between its end flanges in parallel and spaced relation to its forward side flange, and which serves as a pivot for the guard or wall member of the carrier hereinafter to be described.

The other step plate of the pair carries two studs 10 which project inwardly from the forward side flange of the plate adjacent the end flanges of the same and each of these studs has a transverse aperture for the application of a split cotter pin 12. The cotter pins provide a convenient means for locking the guard-member of the carrier upon the studs as will hereinafter be more fully explained, and inasmuch as they must be withdrawn from the apertures of the studs when the guard-rail is detached, they are fastened at the ends of chains 13 which by connection with the plate at convenient points thereof, prevent them from getting lost when the carrier is not in use.

The guard or side wall member of the carrier hereinbefore repeatedly referred to, consists of an extensible frame work 14 of the well known lazy tong construction which at one end is pivotally mounted upon the rod 9 on the one step plate and which at its opposite end has openings for its connection with the studs 10 on the other step plate.

The extensible member is proportioned so that in its contracted condition, it will fit easily inside the step plate to which it is pivotally connected as shown in Figures 6 and 10, and it is at its pivoted end supported upon washers 15 placed on the rod, to space its end from the end flange of the plate which is lowermost when the plate is in an upright position.

A pivoted latch 16 is provided to hold the guard member 14 in its collapsed condition inside the step plate with which it is permanently connected, and the two step plates are preferably provided with pivoted catches 17 best shown in Figure 10, which lock them in their normal position on the running board when the carrier is not in use.

The catches co-operate with keepers 18 applied to the running boards beneath the step plates and they are engaged by push-bolts 19 extending through apertures in the inner end flanges of the plates so that they may be withdrawn by finger pressure when the step plates are to be raised to an upright position in constructing the carrier.

In the use of my invention, the step plates in their normal position in which they lie flat upon the running board of the automobile as shown in Figures 1, 3 and 10, perform the functions of the ordinary plates commonly provided on automobiles and other similar vehicles, to protect the surface of the running board against wear and to remove mud and sand from the shoes of the passengers.

When it is desired to construct the luggage carrier, the two step plates are moved about their hinges to an upright position as illustrated in Figures 5, 6 and 7, and the side-member 14 which is normally concealed in a folded condition in the step plate on which it is pivoted, is unlocked by adjustment of the latch 16, moved about its pivotal axis and extended at right angles to the plate until its free end engages with the studs 10 of the other plate, where it is locked against accidental displacement by means of the cotter pins 12.

The plates and the guard members thus relatively positioned from the end and side walls of an enclosure extending alongside of the vehicle body for the reception of luggage and parcels of different kinds.

The three members sustain each other in their operative position to provide a strong and rigid structure and when the use of the luggage carrier is no longer required, the structure is readily collapsed after the cotter pins are removed from the studs, and restored to its normal condition in which the lazy tong guard member is contained in one of the hollow step plates and both plates lie horizontally upon the running board, secured by the catches 17.

What I claim and desire to secure by Letters Patent is:

1. A luggage carrier for automobiles comprising in combination with a running board of a motor vehicle, two plates normally lying flat on the running board and adjustable to an upright position to form the end walls of the carrier structure, an extensible side-wall member adapted to be stored in a folded condition beneath one of the plates, and means for fastening the ends of the side wall member in its extended position to the two plates.

2. A luggage carrier for automobiles comprising in combination with a running board of a motor vehicle, two plates normally lying flat on the running board and adjustable to an upright position to form the end walls of the carrier structure, a lazy-tong side-wall member adapted to be stored in a folded condition beneath one of the plates, and means for fastening the ends of the side wall member in its extended position to the two plates.

3. A luggage carrier for automobiles comprising in combination with a running board of a motor vehicle, two plates normally lying flat on the running board and adjustable to an upright position to form the end walls of the carrier structure, an extensible side-wall member pivoted at one end to one of the plates and adapted to be stored in a folded condition beneath the same plate, and means for fastening the other end of the side-wall member to the other plate.

4. A luggage carrier for automobiles comprising in combination with a running board of a motor vehicle, plates hinged on the running board for their adjustment to an upright position to form the end walls of the carrier structure, an extensible side-wall member adapted to be stored in a folded condition beneath one of the plates, and means for fastening the ends of the side wall member in its extended position to the two plates.

5. A luggage carrier for automobiles comprising in combination with a running board of a motor vehicle, two plates normally lying flat on the running board and adjustable to an upright position to form the end walls of the carrier structure, a lazy tong side-wall member pivoted at one end to one of the plates and adapted to be stored in a folded condition beneath the same plate, and means for fastening the opposite end of the side-wall member to the other plate.

6. A luggage carrier for automobiles comprising in combination with a running board of a motor vehicle, two plates normally lying flat on the running board and adjustable to an upright position to form the end walls of the carrier structure, a lazy-tong side-wall member pivoted at one end to one of the plates and adapted to be stored in a folded condition beneath the same plate, and studs on the other plate, co-operating with apertures in the opposite end of the side-wall member, to lock the member in its extended position between the plates.

In testimony whereof I have affixed my signature.

WILLIAM WEST.